US012123293B2

(12) United States Patent
Schmidt et al.

(10) Patent No.: US 12,123,293 B2
(45) Date of Patent: Oct. 22, 2024

(54) METHOD FOR GENERATING SELF-PROPPED HYDRAULIC FRACTURES

(71) Applicant: Quidnet Energy Inc., Houston, TX (US)

(72) Inventors: Howard Schmidt, Hockley, TX (US); Scott Wright, Houston, TX (US); Bunker Hill, Sugar Land, TX (US); Henry Lau, Edmonton (CA)

(73) Assignee: Quidnet Energy, Inc., Houston, TX (US)

( * ) Notice: Subject to any disclaimer, the term of this patent is extended or adjusted under 35 U.S.C. 154(b) by 0 days.

(21) Appl. No.: 18/128,004

(22) Filed: Mar. 29, 2023

(65) Prior Publication Data

US 2023/0313657 A1 Oct. 5, 2023

Related U.S. Application Data

(60) Provisional application No. 63/325,066, filed on Mar. 29, 2022.

(51) Int. Cl.

| | |
|---|---|
| ***E21B 43/267*** | (2006.01) |
| ***C09K 8/60*** | (2006.01) |
| ***C09K 8/66*** | (2006.01) |
| ***C09K 8/80*** | (2006.01) |

(52) U.S. Cl.
CPC ............ *E21B 43/267* (2013.01); *C09K 8/601* (2013.01); *C09K 8/665* (2013.01); *C09K 8/80* (2013.01); *C09K 2208/24* (2013.01)

(58) Field of Classification Search
None
See application file for complete search history.

(56) References Cited

U.S. PATENT DOCUMENTS

| | | | | |
|---|---|---|---|---|
| 4,887,670 | A * | 12/1989 | Lord | E21B 43/267 166/308.1 |
| 6,192,985 | B1 * | 2/2001 | Hinkel | E21B 43/26 507/202 |
| 2015/0068746 | A1 * | 3/2015 | Abass | E21B 43/267 166/280.2 |
| 2016/0305229 | A1 * | 10/2016 | Hampton | E21B 43/267 |
| 2016/0319185 | A1 * | 11/2016 | Semenov | E21B 43/267 |
| 2018/0238160 | A1 * | 8/2018 | Nguyen | E21B 43/26 |

* cited by examiner

*Primary Examiner* — Andrew Sue-Ako
(74) *Attorney, Agent, or Firm* — Tumey L.L.P.

(57) ABSTRACT

A method for generating self-propped hydraulic fractures. In one embodiment, the method comprises injecting three fluid stages sequentially, each with successively higher viscosity, comprising a pad, a sealing slurry, and a displacement fluid which may be referred to as a sweep. Compositions of each of the three fluid stages are provided, each of which may be selected based upon characteristics of the formation being treated or upon one or more characteristics of the desired fracture.

15 Claims, No Drawings

METHOD FOR GENERATING SELF-PROPPED HYDRAULIC FRACTURES

CROSS-REFERENCE TO RELATED APPLICATIONS

This application is a non-provisional application that claims the benefit of U.S. Provisional Application No. 63/325,066 filed on Mar. 29, 2022, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

The present invention pertains to methods and compositions for providing fractures of subterranean geological formations with a sealed perimeter.

Background of the Invention

Hydraulic fracture technology may be employed in conjunction with a wellbore to access geological materials and subterranean locations of interest for a variety of purposes. Often the geological material of interest may be one or more fluids located or trapped in pore spaces of the rock matrix, for example hydrocarbon fluids such as oil or gas. Hydraulic fractures may also be utilized to access geopressured fluids, geothermal brines, or other minerals of interest. In other applications, a fracture may be utilized as a heat exchanger to exploit thermal features of the rock matrix. Alternatively, hydraulic fractures may be utilized to store pressurized fluids for energy storage purposes. In these cases and others, fluid transport through the fracture may be critically important. Thus, after formation, it may often be desirable to prop the rock faces apart to better enable a fluid's ability to flow through the fracture. For example, in the oil field this may be commonly accomplished by injecting solid proppant particles into the fracture during the formation of the fracture. In certain geothermal applications, pre-existing stress in the rock may be exploited to prevent perfect recovery of the rock configuration; such hydroshear allows modest fluid flow without injecting proppants.

Propped hydraulic fractures may typically be created and propped at the same time, and traditionally comprises two fluids pumped in sequence. The first fluid, often not containing any solids and referred to as a pad, may be injected to initiate and open the fracture; the second fluid is commonly a proppant loaded slurry which transports and deposits the proppant particles to the fracture. Under certain conditions, it may be desirable to inject a third fluid called tail or sweep, but such fluids are commonly employed to clear the wellbore without sweeping proppant away from the wellbore. Occasionally, the proppant concentration may be varied during injection to achieve a screen-out and generate an especially wide fracture with higher conductivity; which may depend on having a rock matrix with some modicum of permeability so that the slurry dehydrates and stops propagating in the fracture. Under typical conditions, the proppant material retains connected pore space that allows hydraulic communication from the wellbore all the way to the distal tip of the fracture.

To promote high flow rates, it may be highly desirable for a fracture to remain open without proppants. This typically requires substantial net pressure to remain in the fracture after formation of the fracture. Competent rocks seldom have high fracture toughness, and net pressure is normally rapidly lost due to extension of the fracture. Usually, retained net pressures will decrease to just a few PSI and fracture widths may end up less than one millimeter. Consequently, there is a need for one or more methods of treating a fracture which retains elevated net pressure, as well as one or more compositions capable of promoting such treatment.

BRIEF SUMMARY OF SOME OF THE PREFERRED EMBODIMENTS

These and other needs in the art are addressed in one embodiment by a method of sealing one or more hydraulic fractures which comprises treating the fracture with modified fluids and particle assemblies to generate a hydraulic fracture with a sealed perimeter that retains elevated net pressure, creating a substantial void volume with high conductivity proximal to the wellbore. The seal may be placed into a pre-existing fracture that has been substantially drained before treatment, or the fracture may be formed at the same time that the seal is placed within the fracture. The treatment may be applied to horizontal, vertical or dipping fractures. The treatment may be further applied to plunging vertical fractures if the fracturing fluid has sufficient density to generate a hydrostatic gradient greater than the local rock fracture gradient.

In one embodiment the modified fluids and particle assemblies may include a pad comprising bentonite mud; a slurry comprising rubber tire crumb (RTC) in linear guar; and a sweep comprising cross-linked guar with enzymatic breaker. In a second embodiment the modified fluids and particle assemblies may include a pad comprising water; a slurry comprising class H cement; and a sweep comprising cross-linked guar with enzymatic breaker. In a third embodiment, the modified fluids and particle assemblies may include a pad comprising 1% partially hydrolyzed poly acrylamide (PHPA) gel; a slurry comprising buffered metal ion cross-linked 1% PHPA loaded with RTC mixture; and a sweep comprising linear guar with enzymatic breaker.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

The method for generating self-propped hydraulic fractures may include injecting a plurality of fluid stages sequentially, each of which may have successively higher viscosity. In an embodiment the fluid stages may include a pad, a sealing slurry, and a displacement fluid which may be referred to as a sweep. Furthermore, a spacer, or buffer stage, can be added ahead, between, or behind any of the other stages.

In embodiments, the pad may have the lowest viscosity and the smallest volume of the three fluid stages, for example a viscosity from one to hundreds of centipoise (cP), or alternatively, from one to one thousand cP, or a volume from one to thirty percent of the total treatment volume. The pad may include clean water if the formation has high toughness and very few joints, fissures, and/or inclusions. In embodiments where the method may be applied to more brittle or defected formations, a viscous fluid of some hundreds of centipoise may be helpful in opening the fracture and propagating through defects in the rock matrix. Often, a function of the pad is to open the fracture and allow entry of bridging particles, if any, entrained in the sealing slurry. In embodiments where the sealing slurry may lack solid particles that might bridge the fracture, the pad stage may be omitted. Under normal circumstances the width of the fracture at the tail of the pad may decrease monotonically during the treatment process; this may be true even in rock matrices with effectively zero leak-off. The volume of the pad may be tuned considering the size of bridging particles in the next stage to achieve bridging at a desired particular fracture radius or fracture volume. In rock matrices with non-negligible leak-off due to matrix permeability, clay hydration or imbibition, the pad volume may be increased to compensate for leak-off. Matrix leak-off may also be suppressed by including in the pad water retention additives like polymers, clays and pore-sized solids like silica flour.

In embodiments, the second stage sealing slurry may contain material for forming an impermeable barrier near the tip of the fracture. Injected as a fluid, the slurry, which may comprise a solution or mixture, may be intended to form a solid or semi-solid barrier to fluid flow. In embodiments, the slurry may have significantly higher viscosity than the pad to prevent fingering, mixing and dilution with the pad fluid. The sealing slurry may include micron- to millimeter-scale particles at 5% to 30% by weight, and having specific gravities between 0.8 and 1.3, for bridging the fracture and/or anchoring the slurry as it forms an impermeable seal. For example, the particles may be included by weight between 5% and 15%, between 10% and 20%, between 15% and 25%, and between 20% and 30%. The seal may be accomplished by polymerization of resins and monomers included in the fluid, by de-watering a particle slurry to form an impermeable packed bed, by cross-linking a polymer solution, through inorganic processes which may form a cement, or through other similar means, and/or mixtures thereof. Embodiments may include fiber, clay, asphalt emulsion, water-born epoxy resins plus hardeners, particle slurries such as crushed rock, walnut shells, rubber tire crumb, pre-formed particle gels, metal cation crosslinkers for hydrolyzed polyacrylamide, Portland cement, or combinations thereof. These are only exemplary systems, and those of ordinary skill in the art of geotechnical grouting, conformance control, water shut-off, lost circulation materials, among others, may be aware of many similar and complementary systems, materials and approaches which may be substituted for these exemplary systems. In embodiments of the method, the sealing slurry may comprise three to fifty percent of the total treatment volume. In embodiments, the initial viscosity of the sealing fluid may range alternatively from 10 cP to 5,000 cP, from 10 cP to 4,000 cP, from 10 cP to 3,000 cP, or from 10 cP to 2,000 cP.

In embodiments, the third stage may serve to displace the sealing slurry to the tip of the fracture while increasing the radius, width and eventual working volume of the fracture. In embodiments of the method, the third stage may form the largest and most viscous stage of the treatment, for example a hyper-viscous gel comprising five to ninety percent of the total volume. The viscosity of the sweep fluid may be selected such that it may displace the slurry without fingering, mixing, and/or dilution, and may range from 100 cP to 100,000 cP, from 100 cP to 200,000 cP, from 100 cP to 300,000 cP, from 100 cP to 400,000 cP, from 100 cP to 500,000 cP, from 100 cP to 600,000 cP, from 100 cP to 700,000 cP, from 100 cP to 800,000 cP, from 100 cP to 900,000 cP, or from 100 to 1,000,000 cP. Embodiments of the sweep fluid may comprise particles between 0.01% and 5% by weight, having specific gravities between 0.8 and 1.3, and/or cross-linked gels, for example borate cross-linked guar, heavy bentonite muds, clay+polymer mixtures, cross-linked polyacrylamides, or combinations thereof. In such embodiments, particles may be included by weight between 0.01% and 0.5%, between 0.1% and 1%, between 0.5% and 2%, between 1% and 3%, between 2% and 5%, or between 3% and 5%. Because the sweep fluid may be removed or washed out of the fracture after the slurry has formed an impermeable seal, it may be advantageous to include with the third stage, or inject separately, a breaker, if suitable, to reduce viscosity of the sweep after a pre-determined period of time.

In embodiments, the treatment may further comprise a spacer, or buffer, stage which may serve to physically separate any of the stages from each other, and may precede or follow any of the stages. The spacer stage can comprise one to 50% of the total treatment volume. In embodiments, the buffer stage may be any of the fluids noted, or may be a unique fluid or slurry. The primary characteristic of this stage is to provide space between active stages for cost savings, delay of chemical reaction, or to prevent any other fluid interaction that may be undesirable for the process and outcome. The viscosity and/or shear thickening characteristics of the spacer fluid may be selected such that it may keep stages separated from one another without digitization, mixing, or dilution. The spacer fluid may be left in the fracture permanently, chemically altered in situ, or be cycled out of the fracture over time.

Additional fluids or chemicals may be included with any of the stages described, or may be injected separately, in order to provide additional benefits to fracture formation. Examples of such fluids or chemicals may include those which may lower the viscosity of the previously injected fluid, those which may cause or encourage shear thickening, or those which may serve as healing materials for a previous stage.

In embodiments of the method for generating self-propped hydraulic fractures, the compositions of the first, second, and third stage fluids may vary, and may be selected based upon characteristics of the formation being treated, or upon one or more characteristics of the desired treated fracture. For example, in a first embodiment, the injection fluids may include a 15% (of total volume) pad comprised of 27 pounds-per-barrel (ppb) bentonite mud; a 30% (of total volume) slurry comprised of up to 2 mm rubber tire crumb (RTC) in 25 pounds-per-thousand (ppt) cross-linked guar with 4 ppb mineral fiber; a 4% (of total volume) spacer fluid comprised of 2% PHPA, and a 51% (of total volume) sweep comprised of 35 ppt cross-linked guar with enzymatic breaker. In a second embodiment, the modified fluids and particle assemblies may include a 20% (of total volume) pad comprised of water; a 40% (of total volume) slurry comprised of class H cement; and a 40% (of total volume) sweep comprised of 35 ppt cross-linked guar with enzymatic breaker. In a third embodiment, the modified fluids and particle assemblies may include a 2% (of total volume) pad comprised of 1% partially hydrolyzed poly acrylamide (PHPA) gel; a 16% slurry comprised of buffered metal ion cross-linked 1% PHPA loaded with RTC mixture up to 2 mm; and a 82% sweep comprised of 35 ppt cross-linked guar with enzymatic breaker.

Although the present invention and its advantages have been described in detail, it should be understood that various changes, substitutions and alterations may be made herein without departing from the spirit and scope of the invention as defined by the appended claims.

What is claimed is:

1. A method of generating a self-propped hydraulic fracture, comprising:

injecting a first fluid into a wellbore, wherein the first fluid comprises 27 pounds-per-barrel (ppb) bentonite mud and has a viscosity from one to one thousand centipoise;

injecting a second fluid into the wellbore, wherein the second fluid comprises up to 2 mm rubber tire crumb (RTC) in 25 ppb cross-linked guar with 4 ppb mineral fiber; and has a viscosity from ten to five thousand centipoise and is loaded between 5% and 30% by weight with particles injecting a spacer fluid, wherein the spacer fluid comprises a 2% partially hydrolyzed poly acrylamide (PHPA); and injecting a third fluid into the wellbore, wherein the third fluid comprises a 35 ppt cross-linked guar with enzymatic breaker and has a viscosity of one hundred to one million centipoise;

wherein the first fluid is 15% of the total volume of the injected fluids, the second fluid is 30% of the total volume of the injected fluids, the spacer fluid is 4% of the total volume of the injected fluids, and the third fluid is 51% of the total volume of the injected fluids; and wherein the first fluid, the second fluid, and the third fluid are injected such that each successive injection fluid has a viscosity equal to or greater than the viscosity of the preceding fluid.

2. The method of claim 1 followed by a further injection of a fluid with a breaker that substantially lowers the viscosity of the previously injected fluid.

3. The method of claim 1 in which a further injection is of a fluid that is shear thickening.

4. The method of claim 1 in which a further injection is of a fluid that has a chemical component which causes the fluid to reduce, or break, its viscosity over a predetermined range of times.

5. The method of claim 1, wherein the spacer retains nominal composition or is acted upon by one or more downhole or injected chemicals causing the properties of the spacer to change over time.

6. The method of claim 1, wherein the spacer fluid is cycled out of the fracture.

7. A method of generating a self-propped hydraulic fracture, comprising:

injecting a first fluid into a wellbore, wherein the first fluid has a viscosity from one to one thousand centipoise;

injecting a second fluid into the wellbore, wherein the second fluid comprises H class cement and has a viscosity from ten to five thousand centipoise and is loaded between 5% and 30% by weight with particles; and injecting a third fluid into the wellbore, wherein the third fluid comprises 35 ppt cross-linked guar with enzymatic breaker and has a viscosity of one hundred to one million centipoise;

wherein the first fluid is 20% of the total volume of the three fluids, the second fluid is 40% of the total volume of the three fluids, and the third fluid is 40% of the total volume of the three fluids, wherein the first fluid, the second fluid, and the third fluid are injected such that each successive injection fluid has a viscosity equal to or greater than the viscosity of the preceding fluid.

8. The method of claim 7 in which in addition each successive fluid has successively increasing shear thickening properties.

9. The method of claim 7, further comprising injecting a spacer fluid between any of the first, second, or third fluids, wherein the spacer fluid prevents or retards interaction of any of the first, second, or third fluids between which the spacer fluid is injected.

10. The method of claim 9, wherein the spacer fluid retains nominal composition or is acted upon by one or more downhole or injected chemicals causing the properties of the spacer fluid to change over time.

11. The method of claim 9, wherein the spacer fluid is cycled out of the fracture.

12. A method of generating a self-propped hydraulic fracture, comprising:

injecting a first fluid into a wellbore, wherein the first fluid comprises 1% PHPA gel and has a viscosity from one to one thousand centipoise;

injecting a second fluid into the wellbore, wherein the second fluid comprises buffered metal ion cross-linked 1% PHPA loaded with RTC mixture up to 2 mm and begins as a fluid with viscosity from ten to five thousand centipoise but becomes more viscous, or even solid, over time; and is loaded between 5%-30% by weight with particles; and injecting a third fluid into the wellbore, wherein the third fluid comprises 35 ppt cross-linked guar with enzymatic breaker and has a viscosity of one hundred to one million centipoise;

wherein the first fluid is 2% of the total volume of the three fluids, the second fluid is 16% of the total volume of the three fluids, and the third fluid is 82% of the total volume of the three fluids; wherein the first fluid, the second fluid, and the third fluid are injected such that each successive injection fluid has a viscosity equal to or greater than the viscosity of the preceding fluid.

13. The method of claim 12, further comprising injecting a spacer fluid between any of the first, second, or third fluids, wherein the spacer fluid prevents or retards interaction of any of the first, second, or third fluids between which the spacer is injected.

14. The method of claim 13, wherein the spacer retains nominal composition or is acted upon by one or more downhole or injected chemicals causing the properties of the spacer to change over time.

15. The method of claim 13, wherein the spacer fluid is cycled out of the fracture.

* * * * *